United States Patent Office 3,411,064
Patented Nov. 12, 1968

3,411,064
VARIABLE SPEED WINDSCREEN WIPER SYSTEMS USING PERMANENT MAGNET MOTORS
Walter Mellor, Sutton Coldfield, England, assignor to Joseph Lucas (Industries) Limited, Birmingham, England, a British company
Filed Oct. 11, 1965, Ser. No. 494,491
Claims priority, application Great Britain, Oct. 21, 1964, 42,871/64
1 Claim. (Cl. 318—339)

This invention relates to permanent magnet windscreen wiper motors for use in road vehicles.

A motor according to the invention comprises in combination a housing supporting the permanent magnets, a rotor rotatable relative to said housing and supporting the winding of the motor, a commutator through which current is fed to said winding, and three brushes engaging said commutator, the arrangement being such that when direct current is applied to one pair of brushes the motor will be operated at one speed, and when direct current is applied to another pair of brushes the motor will be operated at a different speed.

More particularly, the invention resides in a windscreen wiping system for a road vehicle, the system including a windscreen wiper motor as specified in the preceding paragraph, together with switch means movable by the driver of the vehicle from an off position to a first position in which one pair of brushes is energised, and a second position in which another pair of brushes is energised.

Figure 1:
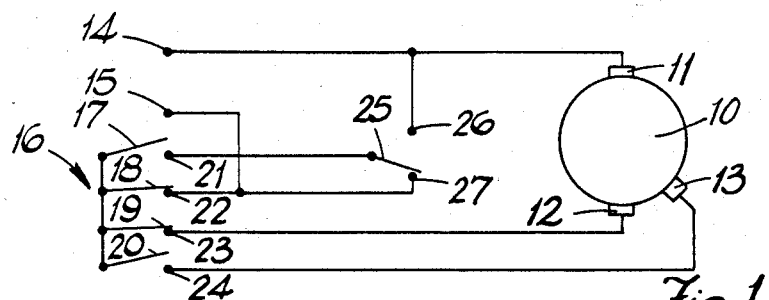
Figure 2:
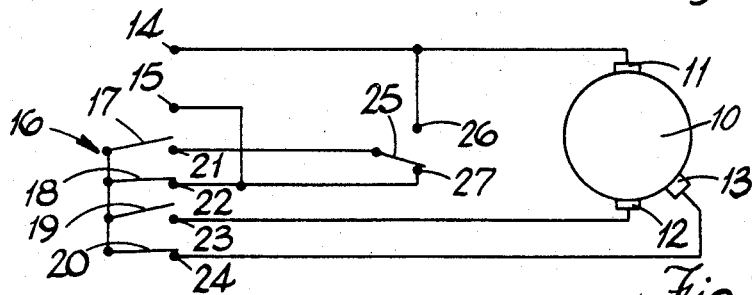
Figure 3:
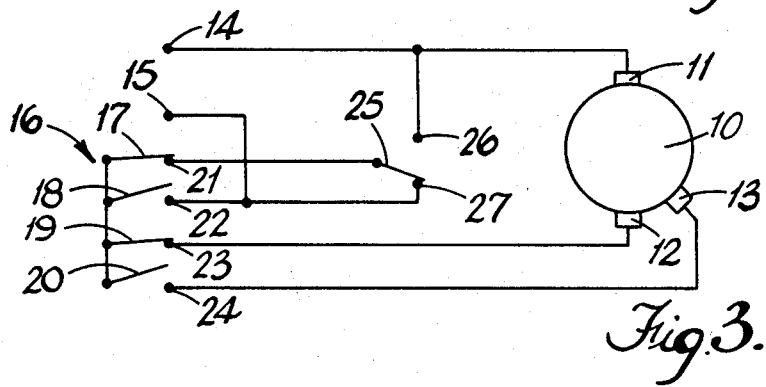

In the accompanying drawings, FIGURES 1, 2 and 3 respectively illustrate the circuits of a windscreen wiping system at its low speed, high speed and off positions.

The drawings illustrate the electrical connections of the system, but the physical construction of the windscreen wiper motor is not shown. The motor includes a housing supporting permanent magnets, and rotatably journalled within the housing is a rotor shaft which carries the rotor and the rotor windings of the motor. Secured to the rotor shaft is a commutator 10 through which current is fed to the windings.

Engaged with the commutator 10 are the usual brushes 11, 12 angularly spaced by 180°, and thus far the arrangement of the motor is entirely conventional. However, a third brush 13 is provided which is angularly spaced from the first and second brushes as shown. The third brush is supported in exactly the same way as the other brushes, but it is found preferable to use a third brush having a circumferential length which is slightly smaller than the circumferential lengths of the other two brushes.

The windscreen wiping system is energised from the vehicle battery by way of supply terminals 14, 15 and a control switch 16 having four contact arms 17, 18, 19, 20 which in their closed positions engage respectively contacts 21, 22, 23, 24. The terminal 14 is connected to the brush 11, whilst the terminal 15 is connected to the contact 22. The contacts 23, 24 are connected respectively to the brushes 12, 13, whilst the contact 21 is connected to the movable arm 25 of a parking switch which when the wipers are in their parking position engages a contact 26 connected to the terminal 14, but at all other times engages a contact 27 connected to the contact 22.

In order to understand the operation of the system, consider first that it is desired to operate the wipers at their low speed. The appropriate position is selected by the driver using the switch 16, and in the low speed condition the contact arms 17, 20 are open, but the contact arms 18, 19 are closed as shown in FIGURE 1. A circuit is completed by way of terminal 14, brush 11, the entire rotor winding, brush 12, contact arm 19 and contact arm 18 to the terminal 15, and so the motor is operated.

If the high speed position is selected, contact arms 17, 19 are open but contact arms 18, 20 are closed as shown in FIGURE 2. In this case, a circuit is completed from terminal 14 through the brush 11, part of the rotor winding, the brush 13, contact arm 20, and contact arm 18 back to terminal 15. Because less of the winding is used, the motor operates at an increased speed as compared with the arrangement shown in FIGURE 1.

When the windscreen wiper motor is switched off, the contact arms 18, 20 are open but the contact arms 17, 19 are closed as shown in FIGURE 3. As long as the wipers are not in their parking position, however, a circuit is completed to the wipers from the terminal 14 by way of the brush 11, the rotor winding, the brush 12, the contact arm 19, the contact arm 17, and the contact arm 25 back to the terminal 15. However, when the wipers reach their parking position, the contact arm 25 engages the contact 26, and not only breaks the circuit to the rotor winding, but actually short-circuits the rotor windings so that braking occurs.

Having thus described my invention what I claim as new and desire to secure by Letters Patent is:

1. A windscreen wiper motor system for a road vehicle, comprising a permanent magnet windscreen wiper motor having a commutator, a pair of brushes diametrically opposite one another and engaging said commutator, a third brush engaging said commutator and angularly spaced from said pair of brushes, said third brush having a circumferential length which is shorter than the circumferential length of said pair of brushes, and switch means operable selectively to energise said pair of brushes or one of said pair of brushes and said third brush, whereby to operate the motor at different speeds.

References Cited

UNITED STATES PATENTS 2,642,555  6/1953  Warner _____ 318—340
3,310,722  3/1967  Diello _____ 318—361

ORIS L. RADER, *Primary Examiner.*

J. J. BAKER, *Assistant Examiner.*